(12) United States Patent
Cho et al.

(10) Patent No.: US 9,025,519 B2
(45) Date of Patent: May 5, 2015

(54) BANDWIDTH REQUEST PREAMBLE SEQUENCE SELECTION METHOD AND RANDOM ACCESS METHOD

(75) Inventors: Hee Jeong Cho, Anyang-si (KR); Young Soo Yuk, Anyang-si (KR); Ki Seon Ryu, Anyang-si (KR); Sung Ho Park, Anyang-si (KR); Jin Young Chun, Anyang-si (KR); Yong Ho Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 296 days.

(21) Appl. No.: 13/254,711

(22) PCT Filed: Mar. 8, 2010

(86) PCT No.: PCT/KR2010/001433
§ 371 (c)(1),
(2), (4) Date: Sep. 2, 2011

(87) PCT Pub. No.: WO2010/101447
PCT Pub. Date: Sep. 10, 2010

(65) Prior Publication Data
US 2011/0317626 A1 Dec. 29, 2011

Related U.S. Application Data

(60) Provisional application No. 61/157,914, filed on Mar. 6, 2009, provisional application No. 61/168,203, (Continued)

(30) Foreign Application Priority Data

Mar. 8, 2010 (KR) ........................ 10-2010-0020320

(51) Int. Cl.
*H04W 4/00* (2009.01)
*H04W 28/20* (2009.01)
(Continued)

(52) U.S. Cl.
CPC ............. *H04W 74/008* (2013.01); *H04L 1/188* (2013.01); *H04W 74/0833* (2013.01)

(58) Field of Classification Search
None
See application file for complete search history.

(56) References Cited

U.S. PATENT DOCUMENTS

| 7,872,038 B2 | 1/2011 | Schnatterer et al. |
| 8,265,013 B2 | 9/2012 | Kim et al. |

(Continued)

FOREIGN PATENT DOCUMENTS

| CN | 101155395 A | 4/2008 |
| CN | 101356846 A | 1/2009 |

(Continued)

OTHER PUBLICATIONS

Zhu et al., "Proposed text changes to the IEEE 802.16m SDD (802.16m-08/003r6), Section 11.9.2.5 on the Bandwidth Request Channel", IEEE 802.16 Broadband Wireless Access Working Group http://ieee802.org/16, IEEE C802.16m-09/0151r1, Jan. 5, 2009, pp. 1-8.

*Primary Examiner* — Phirin Sam
*Assistant Examiner* — Mariela Vidal Carpio
(74) *Attorney, Agent, or Firm* — Birch, Stewart, Kolasch & Birch, LLP

(57) ABSTRACT

The present invention relates to a bandwidth request preamble sequence selecting method for bandwidth requests on a wireless access system, and to a random access procedure using the same. Also, the present invention relates to devices supporting the random access procedure. In one example of the present invention, the method for randomly accessing a wireless access system may comprise the steps of: receiving a first message containing a predefined bandwidth request index from a base station; selecting a bandwidth request preamble sequence from the predefined bandwidth request index on the basis if the properties of uplink data to be transmitted by a mobile terminal; transmitting a second message containing a predefined bandwidth request index to the base station; and transmitting the selected bandwidth request preamble sequence to the base station.

8 Claims, 13 Drawing Sheets

Related U.S. Application Data filed on Apr. 9, 2009, provisional application No. 61/169,286, filed on Apr. 14, 2009, provisional application No. 61/222,942, filed on Jul. 3, 2009, provisional application No. 61/224,057, filed on Jul. 9, 2009.

(51) Int. Cl.
*H04W 74/00* (2009.01)
*H04L 1/18* (2006.01)
*H04W 74/08* (2009.01)

(56) References Cited

U.S. PATENT DOCUMENTS

| | | | |
|---|---|---|---|
| 2005/0047429 A1* | 3/2005 | Koo et al. | 370/447 |
| 2005/0063330 A1 | 3/2005 | Lee et al. | |
| 2006/0121898 A1* | 6/2006 | Kim et al. | 455/435.1 |
| 2007/0206561 A1* | 9/2007 | Son et al. | 370/346 |
| 2008/0031128 A1* | 2/2008 | Jang et al. | 370/210 |
| 2008/0051026 A1 | 2/2008 | Kim et al. | |
| 2008/0181168 A1 | 7/2008 | Han et al. | |
| 2009/0186594 A1* | 7/2009 | Kang et al. | 455/404.1 |
| 2010/0177730 A1* | 7/2010 | Okuda | 370/329 |
| 2010/0195581 A1* | 8/2010 | Shi et al. | 370/329 |
| 2010/0238872 A1* | 9/2010 | Kim et al. | 370/329 |
| 2010/0329129 A1* | 12/2010 | Kroselberg et al. | 370/252 |
| 2012/0063409 A1* | 3/2012 | Novak et al. | 370/330 |

FOREIGN PATENT DOCUMENTS

| | | | | |
|---|---|---|---|---|
| KR | 10-2005-0029112 A | 3/2005 | | |
| KR | 10-2007-0007800 A | 1/2007 | | |
| KR | 10-2008-0016316 A | 2/2008 | | |
| KR | 10-2008-0018566 A | 2/2008 | | |
| KR | 10-2008-0070153 A | 7/2008 | | |
| KR | WO 2008/082908 A1 | 7/2008 | | |
| KR | 2010-515374 A | 5/2010 | | |
| WO | WO 2007/080050 A2 * | 7/2007 | | H04Q 7/38 |
| WO | WO 2008/023943 A1 | 4/2008 | | |

* cited by examiner

FIG. 4

Time →

Frequency ↓

| $Pr_0$ | $Pr_4$ | $Pr_8$ | $Pr_{12}$ | $Pr_{16}$ | $Pr_{20}$ |
|---|---|---|---|---|---|
| $Pr_1$ | $Pr_5$ | $Pr_9$ | $Pr_{13}$ | $Pr_{17}$ | $Pr_{21}$ |
| $M_0$ | $M_6$ | $M_{12}$ | $M_{18}$ | $M_{24}$ | $M_{28}$ |
| $M_1$ | $M_7$ | $M_{13}$ | $M_{19}$ | $M_{25}$ | $M_{29}$ |
| $Pr_2$ | $Pr_6$ | $Pr_{10}$ | $Pr_{14}$ | $Pr_{18}$ | $Pr_{22}$ |
| $Pr_3$ | $Pr_7$ | $Pr_{11}$ | $Pr_{15}$ | $Pr_{19}$ | $Pr_{23}$ |

| $Pr_0$ | $Pr_4$ | $Pr_8$ | $Pr_{12}$ | $Pr_{16}$ | $Pr_{20}$ |
|---|---|---|---|---|---|
| $Pr_1$ | $Pr_5$ | $Pr_9$ | $Pr_{13}$ | $Pr_{17}$ | $Pr_{21}$ |
| $M_2$ | $M_8$ | $M_{14}$ | $M_{20}$ | $M_{26}$ | $M_{32}$ |
| $M_3$ | $M_9$ | $M_{15}$ | $M_{21}$ | $M_{27}$ | $M_{33}$ |
| $Pr_2$ | $Pr_6$ | $Pr_{10}$ | $Pr_{14}$ | $Pr_{18}$ | $Pr_{22}$ |
| $Pr_3$ | $Pr_7$ | $Pr_{11}$ | $Pr_{15}$ | $Pr_{19}$ | $Pr_{23}$ |

| $Pr_0$ | $Pr_4$ | $Pr_8$ | $Pr_{12}$ | $Pr_{16}$ | $Pr_{20}$ |
|---|---|---|---|---|---|
| $Pr_1$ | $Pr_5$ | $Pr_9$ | $Pr_{13}$ | $Pr_{17}$ | $Pr_{21}$ |
| $M_4$ | $M_{10}$ | $M_{16}$ | $M_{22}$ | $M_{28}$ | $M_{34}$ |
| $M_6$ | $M_{11}$ | $M_{17}$ | $M_{23}$ | $M_{29}$ | $M_{35}$ |
| $Pr_2$ | $Pr_6$ | $Pr_{10}$ | $Pr_{14}$ | $Pr_{18}$ | $Pr_{22}$ |
| $Pr_3$ | $Pr_7$ | $Pr_{11}$ | $Pr_{15}$ | $Pr_{19}$ | $Pr_{23}$ |

FIG. 5
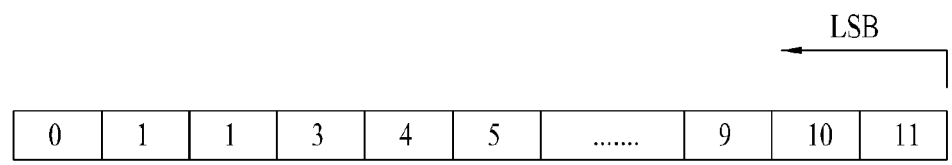
(a)
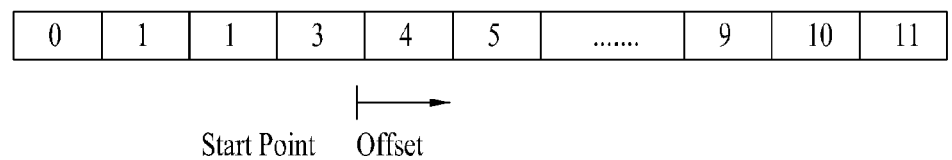
(b)

BANDWIDTH REQUEST PREAMBLE SEQUENCE SELECTION METHOD AND RANDOM ACCESS METHOD

This application is the National Phase of PCT/KR2010/001433 filed on Mar. 8, 2010, which claims priority under 35 U.S.C. 119(e) to US Provisional Application No. 61/157,914 filed on Mar. 6, 2009, 61/168,203 filed on Apr. 9, 2009, 61/169,286 filed on Apr. 14, 2009, 61/222,942 filed on Jul. 3, 2009 and 61/224,057 filed on Jul. 9, 2009 and under U.S.C. 119(a) to Patent Application No. 10-2010-0020320 filed in the Republic of Korea on Mar. 8, 2010, all of which are hereby expressly incorporated by reference into the present application.

TECHNICAL FIELD

The present invention relates to a bandwidth request code selection method for a bandwidth request, a random access scheme, and a device supporting the same in a wireless access system.

BACKGROUND ART

FIG. 1 illustrates an uplink resource allocation procedure of a Mobile Station (MS) using a contention-based request scheme.

Referring to FIG. 1, the MS transmits a randomly selected CDMA code to a randomly selected slot among regions allocated for a Bandwidth Request (BR) in uplink (UL) (S110).

Upon recognizing the CDMA code transmitted by the UE, a Base Station (BS) allocates resources, through which the UE is to transmit a bandwidth request message, using a CDMA allocation Information Element (CDMA_Allocation_IE) (S120).

Upon receiving information about the UL resources for transmission of the bandwidth request message, the MS transmits the bandwidth request message to a corresponding resource region. At this time, the MS may use a BR header which includes information about the size of a requested bandwidth (S130).

If the bandwidth requested by the MS is available, the BS allocates the UL resources to the MS (S140).

The MS transmits data to the allocated UL resources (S150).

DISCLOSURE

Technical Problem

In a wideband wireless access system, an MS which desires to perform a 3-step random access process should transmit a quick access message including a BR preamble sequence and a UL BR information (e.g. station ID and BR size) to the BS.

If the BS does not normally receive the quick access message, the BS cannot acquire information about the MS. Namely, the case may occur where the BS does not know how much bandwidth should be allocated to the MS even though it is requested to allocate bandwidth. Accordingly, the BS needs to obtain meaningful information irrespective of decoding success or failure of the quick access message.

To this end, the MS needs to select a BR preamble sequence by a regular rule using UL BR information. That is, it is desirable that the BS which has detected only the BR preamble sequence be able to specify the UE simply by decoding only the BR preamble sequence.

Moreover, it is necessary for the BS to discern whether the MS has transmitted a quick access message. If the BS does not know whether the MS has transmitted the quick access message, the BS decodes all corresponding radio channels in order to receive the quick access message even in a 5-step random access process during which the MS does not transmit the quick access message, thereby increasing overhead.

Furthermore, if the BS wrongly recognizes that the quick access message has been normally decoded, the BS may allocate UL radio resources to an MS which has not requested the resources. To prevent this, it is desirable to discriminate between a BR preamble sequence in a 3-step random access process and a BR preamble sequence in a 5-step random access process.

Accordingly, the present invention is directed to solve problems due to limitations and disadvantages of the related art and an object of the present invention is to provide a method in which an MS efficiently performs random access.

Another object of the present invention is to provide a method for selecting a random access code according to a random access scheme to be performed by an MS.

A further object of the present invention is to provide various methods for supporting a random access scheme performed by an MS.

Still another object of the present invention is to provide an MS and a network device for solving the above-described problems.

Technical objects to be solved by the present invention are not limited to the above-mentioned objects, and other technical problems not mentioned above can be considered by one skilled in the art from the exemplary embodiments of the present invention to be described hereinbelow.

Technical Solution

The present invention discloses a BR code selection method for a BR, a random access scheme, and a device supporting the same in a wireless access system.

As a first embodiment of the present invention, a method for performing random access in a wireless access system includes steps of receiving a first message including a predefined bandwidth request index from a base station, selecting a bandwidth request preamble sequence from the predefined bandwidth request index based on characteristics of uplink data to be transmitted by a mobile station, transmitting a second message including the predefined bandwidth request index to the base station, and transmitting the selected bandwidth request preamble sequence to the base station.

The characteristics of the uplink data may indicate one or more of a service type related to the uplink data, priority, scheduling type, and bandwidth request size. The predefined bandwidth request index may include a bandwidth request preamble sequence set index and bandwidth request preamble sequence range information. The predefined bandwidth request index may be set according to the characteristics of the uplink data.

In the first embodiment of the present invention, the step of the selecting the bandwidth request preamble sequence may further include steps of selecting, at the mobile station, the bandwidth request preamble sequence set index according to the characteristics of the uplink data, and selecting the bandwidth request preamble sequence from the bandwidth request preamble sequence set index.

In the first embodiment of the present invention, the method may further include steps of receiving a reception acknowledgement message from the base station, indicating that the bandwidth request preamble sequence has been normally received, and receiving a MAP message from the base station, including information about radio resources allocated for transmission of the uplink data or transmission of a bandwidth request header.

In the first embodiment of the present invention, the method may further include steps of receiving a reception acknowledgement message from the base station, indicating whether the bandwidth request preamble sequence has been successfully received, and if the reception acknowledgment message indicates that a reception of the bandwidth request preamble sequence has been failed, retransmitting the bandwidth request preamble sequence to the base station.

When the mobile station performs a 3-step random access process, the mobile station may transmit a quick access message including a station ID for indentifying the mobile station while transmitting the bandwidth request preamble sequence.

The mobile station may receive a reception acknowledgement message from the base station, indicating a reception state of the bandwidth request preamble sequence and the quick access message. If the reception acknowledgement message indicates that the bandwidth request preamble sequence has been normally received and the quick access message has not been normally received, the mobile station may receive a MAP message including information about radio resources allocated for transmission of the uplink data and transmission of a bandwidth request header.

The mobile station may transmit the uplink data or the bandwidth request header to the base station through an allocated radio resource region.

If the reception acknowledgement message indicates that both the bandwidth request preamble sequence and the quick access message have not been normally received, the mobile station may retransmit the bandwidth request preamble sequence and the quick access message to the base station.

In the first embodiment of the present invention, if the base station initiates a dynamic service request, the first message may be one of a dynamic service addition request (DSA-REQ) message and a dynamic service change request (DSC-REQ) message, and if the mobile station initiates a dynamic service request, the first message may be one of a dynamic service addition response (DSA-RSP) message and a dynamic service change response (DSC-RSP) message. If the base station initiates a dynamic service request, the second message may be one of a dynamic service addition response (DSA-RSP) message and a dynamic service change response (DSC-RSP) message, and if the mobile station initiates a dynamic service request, the second message may be one of a dynamic service addition request message and a dynamic service change request message.

As a second embodiment of the present invention, a mobile station for performing random access in a wireless access system includes a transmit module for transmitting a radio signal, a receive module for receiving the radio signal, and a processor for controlling the random access.

The processor may control receiving a first message including a predefined bandwidth request index from a base station, selecting a bandwidth request preamble sequence from the predefined bandwidth request index based on characteristics of uplink data to be transmitted by a mobile station, transmitting a second message including the predefined bandwidth request index to the base station, and transmitting the selected bandwidth request preamble sequence to the base station.

In the second embodiment of the present invention, the characteristics of the uplink data may indicate one or more of a service type related to the uplink data, priority, scheduling type, and bandwidth request size. The predefined bandwidth request index may include a bandwidth request preamble sequence set index and bandwidth request preamble sequence range information.

The processor may further control selecting, at the mobile station, the bandwidth request preamble sequence set index according to the characteristics of the uplink data, and selecting the bandwidth request preamble sequence from the bandwidth request preamble sequence set index.

The first and second embodiments of the present invention are merely some parts of the exemplary embodiments of the present invention and other embodiments into which the technical features of the present invention are incorporated can be derived and understood by those skilled in the art from the detailed description of the present invention which follows.

Advantageous Effects

According to the exemplary embodiments of the present invention, the following effects are obtained.

First, an MS can effectively perform random access to a BS through a 3-step or 5-step random access scheme.

Second, the MS can use a definite method for selecting a random access code according to a random access scheme.

Third, an efficient random access scheme can be performed by supporting a random access scheme to be performed by the MS through DSx processing.

The effects which can be obtained from the exemplary embodiment of the present invention are not limited to what has been particularly described hereinabove, and other effects not mentioned above can be clearly derived and understood by one skilled in the art from the following description of the exemplary embodiments of the present invention. That is, effects which are not intended according to implementation of the present invention may also be derived by one skilled in the art from the exemplary embodiments of the present invention.

DESCRIPTION OF DRAWINGS

FIG. 4 is a diagram illustrating a structure of one bandwidth request channel.

FIGS. 5(a) and 5(b) are diagrams illustrating one method for selecting a BR preamble sequence using a station ID according to an exemplary embodiment of the present invention.

MODE FOR INVENTION

Figure 1:
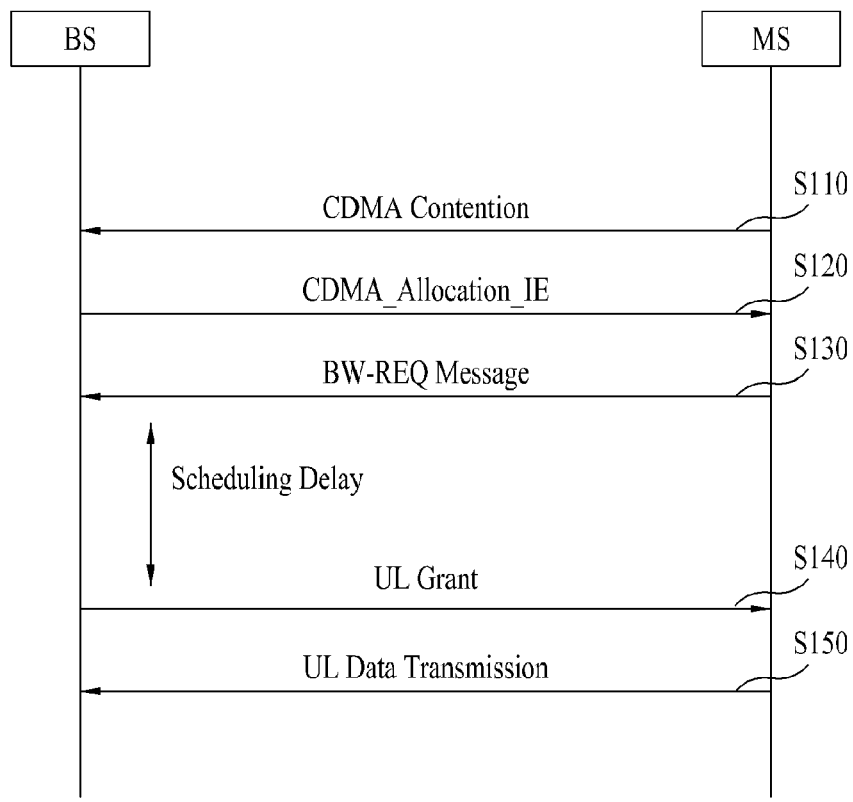
FIG. 1 illustrates a UL resource allocation procedure of an MS using a contention-based request scheme.

The exemplary embodiments of the present invention disclose a BR code selection method for a BR, a random access scheme, and devices supporting the same in a wireless access system.

The exemplary embodiments described hereinbelow are combinations of elements and features of the present invention in prescribed forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of the drawings, procedures or steps, which may obscure the substance of the present invention, are not explained. In addition, procedures or steps, which can be understood by those skilled in the art, are not explained as well.

In the exemplary embodiments of the present invention, a description is made of data transmission and reception between a Base Station (BS) and a Mobile Station (MS). Here, the term 'BS' refers to a terminal node of a network communicating directly with the mobile station. In some cases, a specific operation described as being performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'eNode B (eNB)', 'Advanced Base Station (ABS)', 'access point', etc.

The term 'MS' may be replaced with the term 'User Equipment (UE)', 'Subscriber Station (SS)', 'Mobile Subscriber Station (MSS)', 'mobile terminal', 'Advanced Mobile Station (AMS)', 'terminal', etc.

A transmitting end refers to a fixed and/or mobile node which transmits a data service or a voice service and a receiving end refers to a fixed and/or mobile node which receives a data service or a voice service. Therefore, in uplink, an MS may be a transmitting end and a BS may be a receiving end. Similarly, in downlink, the MS may be a receiving end and the BS may be a transmitting end.

The exemplary embodiments of the present invention can be supported by standard documents disclosed in at least one of wireless access systems including an IEEE 802.xx system, a 3GPP system, a 3GPP LTE system, and a 3GPP2 system. That is, obvious steps or portions that are not described in the embodiments of the present invention can be supported by the above documents.

For all terminology used herein, reference can be made to the above standard documents. Especially, the exemplary embodiments of the present invention can be supported by at least one of P802.16-2004, P802.16e-2005, P802.16Rev2, and P802.16m which are standards documents of the IEEE 802.16 system.

Reference will now be made in detail to the exemplary embodiments of the present invention in conjunction with the accompanying drawings. The detailed description, which will be given below with reference to the accompanying drawings, is intended to explain exemplary embodiments of the present invention, rather than to show the only embodiments that can be implemented according to the invention.

In addition, the specific terms used in the embodiments of the present invention are provided to aid in understanding of the present invention and those terms may be changed without departing from the spirit of the present invention. For example, a Bandwidth Request (BR) preamble sequence used in the exemplary embodiments of the present invention may also be called a BR code.

Figure 2:
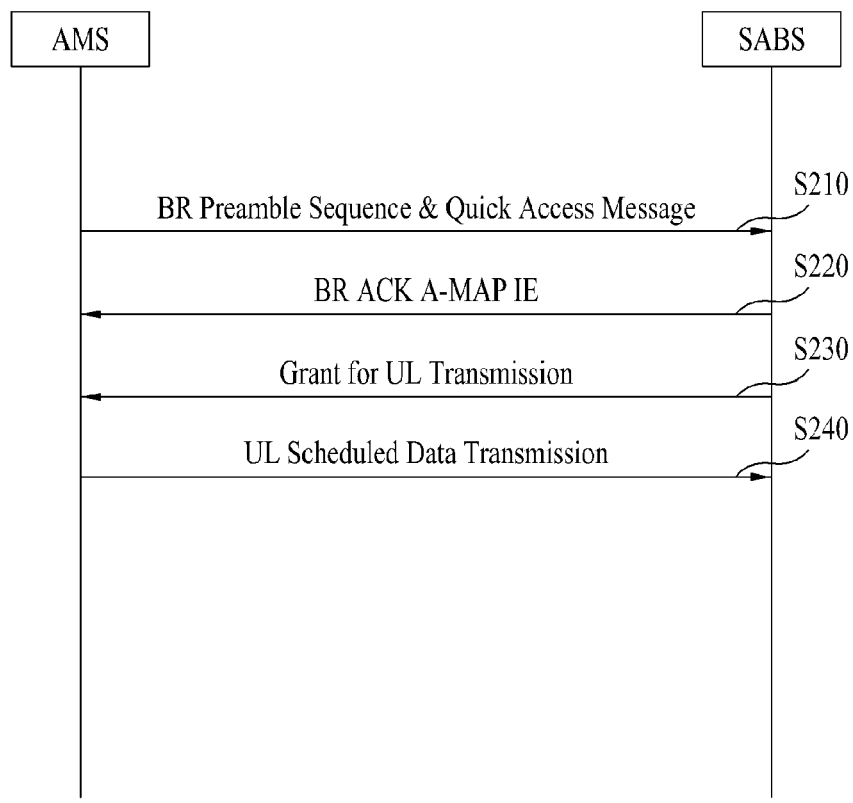
FIG. 2 is a diagram illustrating an example of a 3-step random access based BR process.

FIG. 2 illustrates an example of a 3-step random access based BR process.

In a wideband wireless access system, an Advanced Mobile Station (AMS) may use a 3-step or 5-step random access scheme. The 5-step random access scheme may be independent of the 3-step random access scheme, or may be used as a fallback mode when the 3-step scheme fails.

The AMS transmits a BR preamble request and a quick access message to a Serving Advanced Base Station (SABS) at a randomly selected opportunity (S210).

The quick access message may include a station ID (STID), which is UL BR information and BR index representing BR size and quality of service (QoS).

The SABS may transmit a BR ACK A-MAP Information Element (IE) indicating a reception state of the BR preamble sequence and quick access message transmitted by each AMS to AMSs in a broadcast/multicast format (S220).

Upon normally receiving the BR preamble sequence and quick access message, the SABS allocates UL resources to each AMS and transmits UL resource allocation information to each AMS through a UL basic assignment A-MAP IE (S230).

The AMS may transmit UL data to the SABS through an allocated UL transmission region. At this time, the AMS may transmit additional UL BR information to the SABS (S240).

Figure 3:
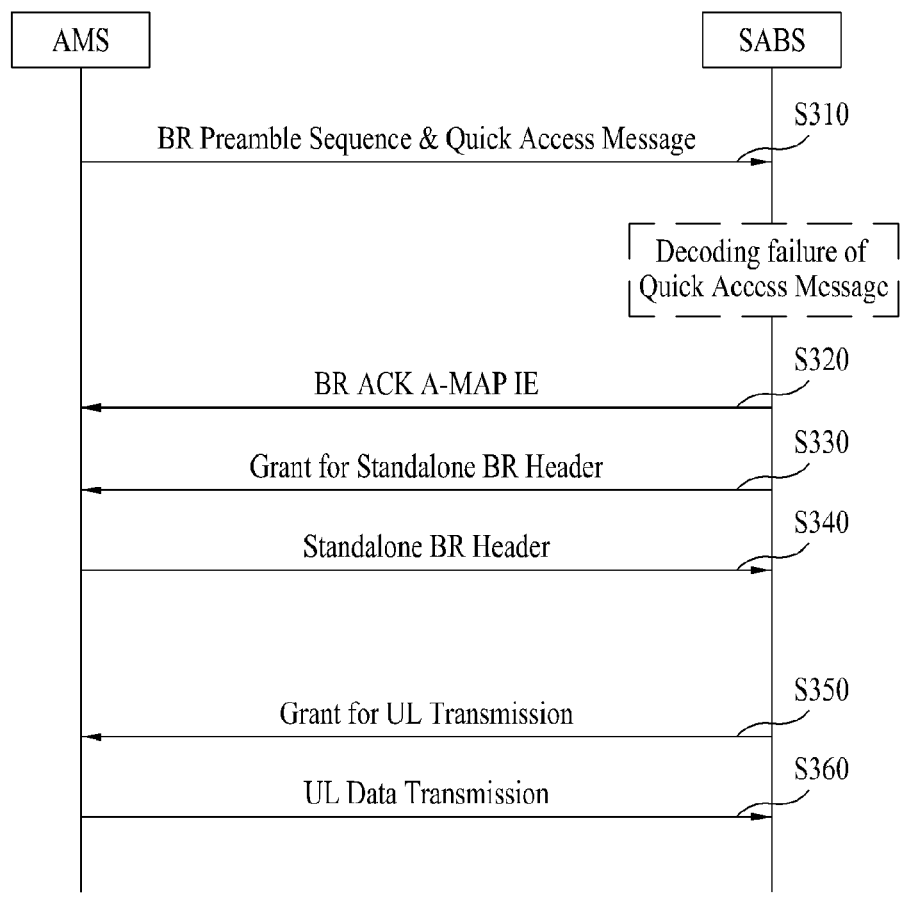
FIG. 3 illustrates an example of a 5-step random access based BR process as a fallback mode when a 3-step random access scheme fails.

FIG. 3 illustrates an example of a 5-step random access based BR process as a fallback mode when a 3-step random access scheme fails.

An AMS transmits a BR preamble sequence (or a BR code), and a quick access message including UL BR information (station ID) and a BR index indicating QoS and RB size to an SABS (S310).

The SABS may transmit a reception state of the BR preamble sequence and quick access message transmitted by each AMS to AMSs through a BR ACK A-MAP IE. It is assumed that the BR preamble sequence has been normally decoded but the quick access message has been decoded with an error. Accordingly, the BR ACK A-AMP IE indicates that the BR preamble sequence has been normally received and the quick access message has an error (S320).

The SABS which has normally received only the BR preamble sequence transmitted by the AMS allocates UL resources, through which the AMS transmits a bandwidth request (BW-REQ) message, to the AMS through a CDMA allocation A-MAP IE (S330).

In step S330, the CDMA A-MAP IE may be transmitted to the AMS as a grant format for a standalone BR.

The AMS transmits a BW-REQ message (e.g. an standalone BR header format) to the SABS through an allocated region (S340).

Upon receiving the BW-REQ message transmitted by the AMS, the SABS allocates UL resources to the AMS using a UL basic assignment A-MAP IE, or a grant message for UL data transmission (S350).

The AMS transmits UL data to the SABS through an allocated UL resource region. In this case, the AMS may transmit additional UL BR information to the SABS (S360).

FIG. 3 shows a 5-step random access scheme as a fallback mode of the 3-step random access scheme of FIG. 2. However, a general 5-step random access scheme exhibits a difference from the scheme of FIG. 3 in that the AMS does not transmit the quick access message in step S310 and the other steps may use those described in FIG. 3.

FIG. 4 is a diagram illustrating an example of a structure of one BR channel.

Referring to FIG. 4, one BR channel is comprised of 3 tiles. One tile includes 6 OFDM symbols in a time domain and 6 subcarriers in a frequency domain. Accordingly, BR preamble sequences Pr0 to Pr23 are repeatedly transmitted within the respective tiles and quick access messages M0 to M35 are transmitted throughout the three tiles.

BR Preamble Sequence Selection Method I

Hereinafter, a method for selecting a BR preamble sequence according to an exemplary embodiment of the present invention will be described.

A BR preamble sequence which is to be used by an MS for a random access scheme may be classified according to a QoS (Quality of Service) key parameter. The QoS key parameter indicates a degree of urgency of a corresponding request and characteristics of data to be transmitted. The QoS key parameter may include a service type, priority, and/or a scheduling type.

In the exemplary embodiments of the present invention, a total of k BR preamble sequences may be divided into one or more BR preamble sequence sets according to purpose. In this case, information about each BR preamble sequence set may be previously defined so as to be known by an MS and a BS.

Alternatively, the information about the BR preamble sequence set may be signaled from the BS with or without a request of the MS. In this case, the information about the BR preamble sequence set may be transmitted together with a UL request related parameter which is transmitted through a Super Frame Header (SFH).

The UL request related parameter may include information about to which position a BR channel is allocated, and information about a BR back-off start time point and a BR back-off end time point to be used in a back-off algorithm.

A predetermined number of BR preamble sequences may be basically allocated to each BR preamble sequence set, and BR preamble sequences may be further allocated thereto according to a specific purpose. The MS and the BS may be previously aware of the number of BR preamble sequences included in each BR preamble sequence set.

Also, the BS may inform the MS of the number of BR preamble sequences through signaling between the MS and the BS. Since the number of BR preamble sequences included in the last BR preamble sequence set can be implicitly discerned by the BS, the BS need not perform additional signaling indicating the number of BR preamble sequences included in the last BR preamble sequence set. If there is a change in previously allocated BR preamble sequence sets, the BS may inform the MS of information thereabout through explicit signaling.

The MS may select a BR preamble sequence set according to characteristics of UL data to be transmitted. Next, the MS may select random BR preamble sequences from the selected BR preamble sequence set.

The following Table 1 shows an example of a BR preamble sequence set classified according to scheduling type.

TABLE 1

| BR Preamble Sequence Set | BR Preamble Sequence Range | Scheduling Type | Note |
|---|---|---|---|
| 0 | 0~9 | Unsolicited grant service (UGS) | UGS is designed to support real-time uplink service flows that transport fixed-size data packets on a periodic basis, such as T1/E1 and Voice over IP without silence suppression. |
| 1 | 10~19 | Real-time polling service (rtPS) | The rtPS is designed to support real-time UL service flows that transport variable-size data packets on a periodic basis, such as moving pictures experts group (MPEG) video. |
| 2 | 20~29 | Extended rtPS (ertPS) | Extended rtPS is a scheduling mechanism which builds on the efficiency of both UGS and rtPS. |
| 3 | 30~39 | Non-real-time polling service (nrtPS) | The nrtPS offers unicast polls on a regular basis, which assures that the UL service flow receives request opportunities even during network congestion. |
|  |  | Best effort service (BE) | The intent of the BE grant scheduling type is to provide efficient service for BE traffic in the UL. |
| 4 | 40~49 | Adaptive grant polling service (aGPS) | One or more QoS parameter set(s) can be defined during the initial service negotiation |

A scheduling service provided in a wireless access system includes an Unsolicited Grant Service (UGS), a real-time Polling Service (rtPS), an extended rtPS (ertPS), a non-real-time Polling Service (nrtPS), a Best Effort service (BE), and an adaptive Grant Polling Service (aGPS).

Referring to Table 1, BR preamble sequence set 0 is allocated for USG and may include BR preamble sequences 0 to 9; BR preamble sequence set 1 is allocated for rtPS and may include BR preamble sequences 10 to 19; BR preamble sequence set 2 is allocated for ertPS and may include BR preamble sequences 20 to 29; BR preamble sequence set 3 is allocated for nrtPS and BE and may include BR preamble sequences 30 to 39; and BR preamble sequence set 4 is allocated for aGPS and may include BR preamble sequences 40 to 49.

In this case, UGS is designed to support real-time service flows for transmitting fixed-size data packets on a periodic basis, such as T1/E1 and Voice over IP (VoIP), to which a silence suppression scheme is not applied.

rtPS is designed to support real-time UL service flows for transmitting variable-size data packets on a periodic basis, such as Moving Picture Experts Group (MPEG) video.

ertPS is a scheduling mechanism designed to achieve the efficiency of both USG and rtPS.

nrtPS provides unicast polls for assuring UL service flow reception request opportunities even during network congestion. That is, nrtPS indicates a service for supporting non-real-time service flows which generate variable-size data packets.

BE indicates a scheduling type for providing an efficient service for best effort traffic in UL.

aGPS indicates one or more QoS parameter sets which can be defined during an initial service negotiation process.

The following Table 2 shows an example of a BR preamble sequence divided according to service type and priority.

TABLE 2

| BR Preamble Sequence Set | BR Preamble Sequence Range | Service Type | Priority | Scheduling Type |
|---|---|---|---|---|
| 0 | 0-5 | Delay Sensitive Service | High | UGS; rtPS; ertPS; |
| 1 | 6-11 | Delay Sensitive Service | Low | aGPS |
| 2 | 12-17 | Delay Tolerant Service | High | nrtPS; BE |
| 3 | 18-23 | Delay Tolerant Service | Low | |

Referring to Table 2, BR preamble sequence sets are classified according to whether the service type is a delay sensitive service or a delay tolerant service. Alternatively, the BR preamble sequence sets may be classified according to whether priority is high or low.

The following Table 3 shows another example of a BR preamble sequence set divided according to service type and priority.

TABLE 3

| BR Preamble Sequence | BR Preamble Sequence Range | Service Type | Priority | Scheduling Type |
|---|---|---|---|---|
| 0 | XXX00 | Delay Sensitive Service | High | UGS; rtPS; ertPS; |
| 1 | XXX01 | Delay Sensitive Service | Low | aGPS |
| 2 | XXX10 | Delay Tolerant Service | High | nrtPS; BE |
| 3 | XXX11 | Delay Tolerant Service | Low | |

In Table 3, BR preamble sequence sets 0, 1, 2, and 3 indicate all BR preamble sequences, two LSBs of which begin with 00, 01, 10, and 11.

The following Table 4 shows an example of a BR preamble sequence set divided according to service type, priority, and BR size.

TABLE 4

| BR Preamble Sequence | BR Preamble Sequence Range | Service Type | Priority | BR Size | Scheduling Type |
|---|---|---|---|---|---|
| 0 | XX000 | Delay Sensitive Service | High | 20 | UGS; rtPS; ertPS; |
| 1 | XX100 | Delay Sensitive Service | High | 40 | aGPS |
| 2 | XX001 | Delay Sensitive Service | Low | 20 | |
| 3 | XX101 | Delay Sensitive Service | Low | 40 | |
| 4 | XX010 | Delay Tolerant Service | High | 50 | nrtPS; BE |
| 5 | XX110 | Delay Tolerant Service | Low | 50 | |

BR preamble sequence sets 0, 1, 2, 3, 4, and 5 of Table 4 indicate all BR preamble sequences, three LSBs of which begin with 000, 100, 001, 101, 010, and 110.

The following Table 5 shows another example of a BR preamble sequence set divided according to service type, priority, and BR size.

TABLE 5

| BR Preamble Sequence Pattern | Service Type | Priority | BR Size (Burst Index) |
|---|---|---|---|
| X0000 | Delay Sensitive Service | High | 10 |
| X0001 | Delay Sensitive Service | High | 18 |
| X0010 | Delay Sensitive Service | High | 23 |
| X0011 | Delay Sensitive Service | High | 27 |
| X0100 | Delay Sensitive Service | Low | 10 |
| X0101 | Delay Sensitive Service | Low | 18 |
| X0110 | Delay Sensitive Service | Low | 23 |
| X0111 | Delay Sensitive Service | Low | 27 |
| X1000 | Delay Tolerant Service | High | 10 |
| X1001 | Delay Tolerant Service | High | 18 |
| X1010 | Delay Tolerant Service | High | 23 |
| X1011 | Delay Tolerant Service | High | 27 |
| X1100 | Delay Tolerant Service | Low | 10 |
| X1101 | Delay Tolerant Service | Low | 18 |
| X1110 | Delay Tolerant Service | Low | 23 |
| X1111 | Delay Tolerant Service | Low | 27 |

In Table 5, BR size may be defined as a burst index. In Table 5, a BR preamble sequence pattern is expressed using four LSBs and an MS may select a BR preamble sequence pattern divided according to service type, priority, and BR size.

The following Table 6 defines a total size of a VoIP packet according to a codec used in an MS and a BS.

TABLE 6

| | EVRC without HC | EVRC with HC | AMR without HC | AMR with HC | GSM 6.10 with HC | GSM 6.10 without HC | G.711 without HC | G.711 with HC | G.723.1 without HC | G.723.1 with HC | G.729.A without HC | G.729.A with HC |
|---|---|---|---|---|---|---|---|---|---|---|---|---|
| Voice Payload | 2/5/10/ 22 | 2/5/100/ 22 | 33 | 33 | 33 | 33 | 80 | 80 | 20/24 | 20/24 | 20 | 20 |
| Protocol Header (IPv4; IPv6) | — | 3; 5 | — | 3; 5 | — | 3; 5 | — | 3; 5 | — | 3; 5 | — | 3; 5 |
| RTP | 12 | — | 12 | — | 12 | — | 12 | — | 12 | — | 12 | — |
| UDP | 8 | — | 8 | — | 8 | — | 8 | — | 8 | — | 8 | — |
| IPv4; IPv6 | 20; 40 | — | 20; 40 | — | 20; 40 | — | 20; 40 | — | 20; 40 | — | 20; 40 | — |
| GMH | 2 | 2 | 2 | 2 | 2 | 2 | 2 | 2 | 2 | 2 | 2 | 2 |
| CRC | 2 | 2 | 2 | 2 | 2 | 2 | 2 | 2 | 2 | 2 | 2 | 2 |
| Total Packet Size (IPv4; IPv6) | 46/49/ 54/66; 66/69/ 74/86 | 9/12/ 17/29; 11/14/ 19/31 | 77; 97 | 40; 42 | 77; 97 | 40; 42 | 124; 144 | 87; 89 | 64; 68; 84/88 | 27/31; 29/33 | 64; 84 | 27; 29 |

Table 6 shows the size of a VoIP packet according to a codec used in an MS and a BS. BR size may be defined considering only widely used Codecs AMR and G729. For example, if two specific bits of a BR preamble sequence are 0b00, the size of a VoIP packet may be defined as burst index 9 (16 bytes), 0b01 may be defined as burst index 14 (29 bytes), 0b10 may be defined as burst index 17 (42 bytes), and 0b11 may be defined as burst index 21 (71 bytes).

An MS may select a BR preamble sequence set divided according to the BR preamble sequence mapping rules as described in Table 1 to Table 6 and select an arbitrary BR preamble sequence from the selected BR preamble sequence set, thereby performing a random access process. The BR preamble sequence mapping rules (e.g. which QoS key parameter is used) described in Table 1 to Table 6 and/or mapping information (e.g. a BR preamble sequence set index and/or a BR preamble sequence number) may be recognized by an MS and a BS as a predefined value or the MS may be informed by the BS through signaling (e.g. SFH transmission or DSx processing).

BR Preamble Sequence Selection Method II

An MS may select a BR preamble sequence using information included in a quick access message, (e.g. an STID), except for a QoS key parameter.

FIGS. 5(a) and 5(b) are diagrams illustrating one method for selecting a BR preamble sequence using an STID according to an exemplary embodiment of the present invention.

Referring to FIG. 5(a), an MS may select a BR preamble sequence using some LSBs or MSBs of an STID and may select the BR preamble sequence using a bit of a predefined specific position (e.g. a 5th or 9th bit).

For example, the MS may select a BR preamble sequence using two LSBs of the STID. Referring to FIG. 5, if 10th and 11th bit values of the STID are 00, the MS selects a BR preamble sequence, n-th and (n+1)-th bit values of which are 00, for example, 'x00xx'. If the 10th and 11th bit values of the STID are 01, the MS selects a BR preamble sequence, n-th and (n+1)-th bit values of which are 01, for example, 'x01xx'. If the 10th and 11th bit values of the STID are 10, the MS selects a BR preamble sequence, n-th and (n+1)-th bit values of which are 10, for example, 'x10xx'. If the 10th and 11th bit values of the STID are 11, the MS selects a BR preamble sequence, n-th and (n+1)-th bit values of which are 11, for example, 'x11xx'. In this case, the MS and the BS may previously recognize how many bits of the STID are used or the BS may inform the MS of the number of bits through signaling.

Moreover, the MS may select a BR preamble sequence according to a bit position value determined by a value calculated using a randomly selected BR opportunity index.

Position 0=m modulo STID length

Position p={(position n−1+offset) modulo STID length} (p>0)

A BR opportunity index m is indexed in an assignment order (time axis) of a BR channel (i.e. BR opportunity) within one frame under the condition of offset≥1. An offset value may be predefined and may be signaled by the BS using an SFH or other broadcast messages.

In FIG. 5(b), a method in which an MS selects a BR preamble sequence according to a BR opportunity index value is shown. Referring to FIG. 5(b), it is assumed that the MS selects a BR opportunity index 4, an offset is 1, and an STID of 2 bits is used.

Position 0 is determined by (4 modulo 12)=4, and position 1 is determined by (4+1 modulo 12)=5. Accordingly, if the 4th and 5th bit values of the STID are '00', the MS selects a BR preamble sequence, n-th and (n+1)-th bit values of which are 00, for example, x00xx. If the 4th and 5th bit values of the STID are '01', the MS selects a BR preamble sequence, n-th and (n+1)-th bit values of which are 01, for example, x01xx. If the 4th and 5th bit values of the STID are '10', the MS selects a BR preamble sequence, n-th and (n+1)-th bit values of which are 10, for example, x10xx. If the 4th and 5th bit values of the STID are '11', the MS selects a BR preamble sequence, n-th and (n+1)-th bit values of which are 11, for example, x11xx.

The MS may also select a BR preamble sequence according to a value obtained by implementing modulo using a total number $k_n$ of BR preamble sequences allocated to a set corresponding to characteristics of UL data to which the MS desires to transmit an STID.

For example, the MS may map various BR sizes beginning from a value calculated through (STID modulo $K_n$). Mapping of BR preamble sequences having an STID of 18, high priority, and a delay sensitive service is shown in the following Table 7.

TABLE 7

| Service Type according to Priority | BR Preamble Sequence Set | BR Preamble Sequence Index | BR Size |
|---|---|---|---|
| High priority delay sensitive service | 0 | 0 | 7 LRU |
| | | 1 | 8 LRU |
| | | 2 | 1 LRU |
| | | 3 | 2 LRU |
| | | 4 | 3 LRU |
| | | 5 | 4 LRU |
| | | 6 | 5 LRU |
| | | 7 | 6 LRU |
| Low priority delay sensitive service | 1 | ... | ... |

Referring to Table 7, since a calculation value of (18 modulo 8) is 2, the MS maps predefined BR sizes beginning from sequence index 2. If such a method is used, although a collision probability between MSs may be lowered, the BS can recognize a size demanded by the MS only after an STID is obtained by decoding a message.

As described above, a fixed BR size may be set to the MS only with a different start point. The fixed BR size may be changed through an S-SFH or an additional broadcast message. The BR size may be transmitted to each MS through a MAC management message (e.g., AAI_RNG-RSP or AAI_SBC-RSP) transmitted during an initial network entry process. Different BR sizes may be allocated to MSs during DSx processing (a dynamic service addition process, change process, or deletion process).

For example, MS A may have 0b00 of 100 bytes and 0b01 of 200 bytes, whereas MS B may have 0b00 of 50 bytes and 0b01 of 100 bytes. Accordingly, if the MS A transmits a BR preamble sequence mapped to 0b00 to a BS, the BS may allocate radio resources capable of transmitting 100 bytes to the MS A. If the MS B transmits a BR preamble sequence mapped to 0b00, the BS may allocate resources capable of transmitting 50 bytes to the MS B.

The MS may map a BR preamble sequence according a flow ID (FID). This method serves to reorder the BR preamble sequence with respect to each BR preamble sequence set in ascending or descending order according to the FID.

For example, if the MS has FIDs 5, 8, and 12 which are used for a delay sensitive service of high priority, the MS may map the FID 5 to 2, the FID 8 to 3, and the FID 12 to 4.

When transmitting a BR preamble sequence mapped according to the FID to the BS, the MS may also transmit information used for the purpose of changing a QoS parameter set for a corresponding FID.

For example, if a QoS parameter set is 1, a specific preamble sequence may define change of a QoS parameter set of an FID from a current QoS parameter set (e.g. 1) to another set (e.g. 0).

BR Preamble Sequence Selection Method III

Hereinafter, a method for selecting a BR preamble sequence in consideration of a QoS parameter such as priority, degree of delay, and/or BR size will be described.

First, an MS may determine a BR preamble sequence based on information transmitted through a Secondary Super Frame Header (S-SFH).

For example, the MS may be previously aware of a differentiated timer value considering a maximum scheduling delay of a BR preamble sequence set. Alternatively, the MS may be informed of the differentiated timer value by the BS through a S-SFH transmitting system information such as a BR opportunity, a BR back-off start/end, etc. In this case, the MS may determine a BR preamble sequence set in consideration of a corresponding differentiated timer value and a maximum delay of data to be transmitted to UL.

For instance, if a differentiated timer of a BR preamble sequence set 0 is 20 ms, a differentiated timer of a BR preamble sequence set 1 is 40 ms, and a maximum delay value of data to be transmitted by the MS is 30 ms, then the MS selects one BR preamble sequence from the BR preamble sequence set 0.

Second, the MS may determine a BR preamble sequence through DSx processing.

For example, the MS and the BS may exchange a Dynamic Service Addition (DSA) message and a Dynamic Service Change (DSC) message when generating and changing a service flow, respectively. Both the MS and the BS may request generation and change of the service flow. In these processes, the MS and the BS may negotiate a BR preamble sequence determination element (e.g. a QoS key parameter) to be used when performing a UL resource request for a corresponding service flow. In this case, the MS and BS may consider a QoS parameter and BR size.

Figure 6:
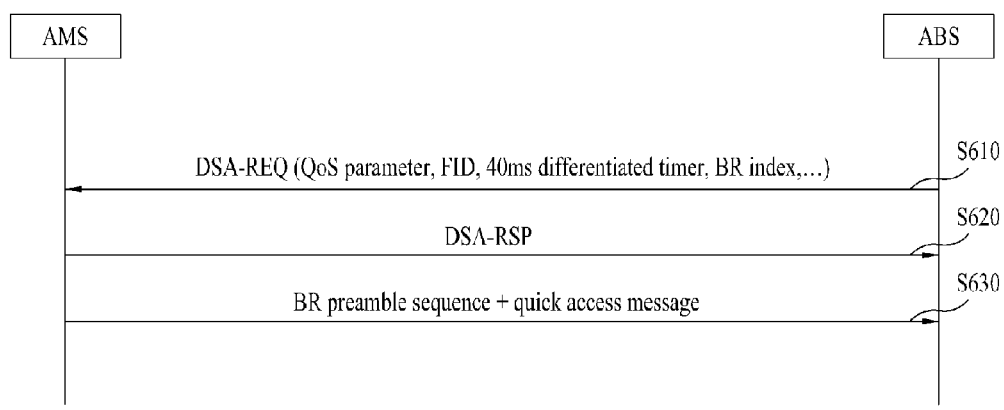
FIG. 6 is a diagram illustrating one method for determining a BR preamble index through DSx processing according to an exemplary embodiment of the present invention.

FIG. 6 is a diagram illustrating one method for determining a BR preamble index through DSx processing according to an exemplary embodiment of the present invention.

Referring to FIG. 6, an ABS may transmit a DAS-REQ message for requesting generation of a service flow to an AMS. The DSA-REQ message may include at least one of a QoS parameter of a corresponding service flow, an FID (service flow identifier), a BR preamble sequence set index to be used when requesting UL resources for a corresponding service flow, a predefined BR index (i.e. a BR size index), and a differentiated timer value (S610).

The ABS and the AMS may configure and determine, during DAS processing, BR size (or flow size) to be used in a 3-step random access process. The following Table 8 shows an example of a BR size index.

TABLE 8

| BR Size Index | BR Size |
|---|---|
| 0b0000 | 100 |
| 0b0001 | 200 |
| 0b0010-1111 | Unused |

As shown in Table 8, if the BR size index (i.e. predefined BR index) is configured with 4 bits, the BR size index may indicate a total of 16 types of BR sizes. Among these, the ABS and the AMS may allocate one unused index (0b0010) as a specific BR size and perform negotiation to indicate that the index means a request for a specific size (e.g. 300 bytes).

In this case, the ABS and/or the AMS may determine the BR size and/or the predefined BR index considering a QoS parameter of a corresponding service flow. Accordingly, if there are indexes having the same characteristic and the same size, the ABS transmits the index to the AMS.

If adjustment of corresponding values is needed, the AMS transmits a DSA-RSP message including an adjusted corresponding values including BR size. In FIG. 6, it is assumed that the AMS uses values included in the DSA-REQ message without adjustment. In this case, the DSA-RSP message may include the predefined BR index (S620).

If data to be transmitted to UL for a corresponding service flow is present, the AMS selects a BR preamble sequence based on negotiated information (e.g. the predefined BR index etc.) during a DSA process and transmits the BR preamble sequence to the ABS (S630).

Since a BR preamble sequence is selected based on information negotiated during service flow generation and change processes, the ABS may easily be aware of main characteristics (e.g. degree of urgency, etc.) of data to be transmitted by the AMS and the requested BR size based on information about the received BR preamble sequence and quick access message.

The ABS and/or AMS may use the BR size index to change a QoS parameter set in one flow (aGPS) rather than using the BR size as actual BR size information.

For example, if 0b0011 is used to change a QoS parameter set, the AMS may transmit an index value of 0b0011 to the ABS through a BR preamble sequence and a quick access message in step S630. The ABS changes the QoS parameter set by recognizing that a current QoS parameter set (e.g. 1) of an FID mapped in a BR size index included in a received BR code should be changed to another QoS parameter set (e.g. 0).

BR Preamble Sequence Transmission Method

Hereinbelow, error processing when there is an error during BR will be described. That is, a method is described in which an AMS transmits a BR preamble sequence selected though the BR preamble sequence selection methods I to III.

The number of BR preamble sequences, $k_0$-$k_{m-1}$, used for a 3-step random access scheme or the number of BR preamble sequences, $k_m$, used for a 5-step random access scheme are previously defined or may be transmitted by an ABS through an S-SFH.

The ABS may transmit a BR preamble sequence and a quick access message selected according to the mapping rules described in the above BR preamble sequence selection methods I-III to the ABS. Upon receiving the BR preamble sequence and the quick access message, the ABS may obtain information (e.g. service type, priority, and/or scheduling type) included in the BR preamble sequence according to the BR preamble sequence mapping rules.

Figure 7:
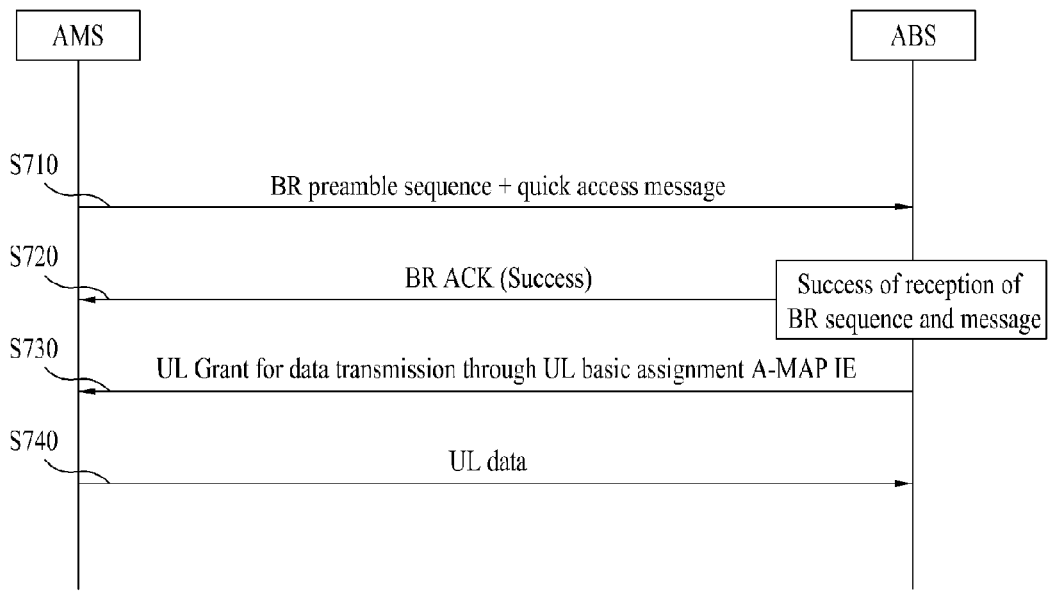
FIG. 7 is a diagram illustrating an example of a 3-step random access scheme according to another exemplary embodiment of the present invention.

FIG. 7 is a diagram illustrating an example of a 3-step random access scheme according to an exemplary embodiment of the present invention.

In FIG. 7, it is assumed that an AMS selects and uses a BR preamble sequence according to the BR preamble sequence mapping rule of Table 4. That is, it is assumed that a BR preamble sequence set and a BR preamble sequence range are determined according to a service type of UL data, priority, and BR size. In FIG. 7, it is also assumed that an ABS normally receives both a BR preamble sequence and a quick access message which are transmitted by the AMS.

The AMS transmits, to the ABS, a BR preamble sequence and a quick access message selected according to BR size and characteristics of UL data to be transmitted (S710).

The AMS operates a BR timer after transmitting, in step S710, the message. When receiving radio resource allocation information for UL data transmission from the ABS or sensing a reception failure through a BR ACK, before the BR timer is terminated, the AMS ends the corresponding timer. However, if the AMS does not receive the radio resource allocation information before the BR timer is terminated, the AMS may reattempt the UL resource request procedure of step S710.

Upon receiving the BR preamble sequence and the quick access message, the ABS may inform the AMS as to whether the BR preamble sequence and the quick access message have been received through the BR ACK message (S720).

The ABS may recognize the characteristics of data to be transmitted by the AMS and BR size through the received BR preamble sequence. Since the received BR preamble sequence is a sequence allocated for a UL request of a 3-step random access scheme, the ABS decodes the quick access message and is able to recognize an AMS which requests UL bandwidth through the quick access message. Accordingly, the ABS allocates radio resources corresponding to the requested bandwidth to the AMS within a differentiated time according to the data characteristics and may transmit assignment information to the AMS through a general MAP IE (e.g. UL basic assignment A-MAP IE) (S730).

The AMS may transmit UL data to the ABS through an allocated UL resource region (S740).

Figure 8:
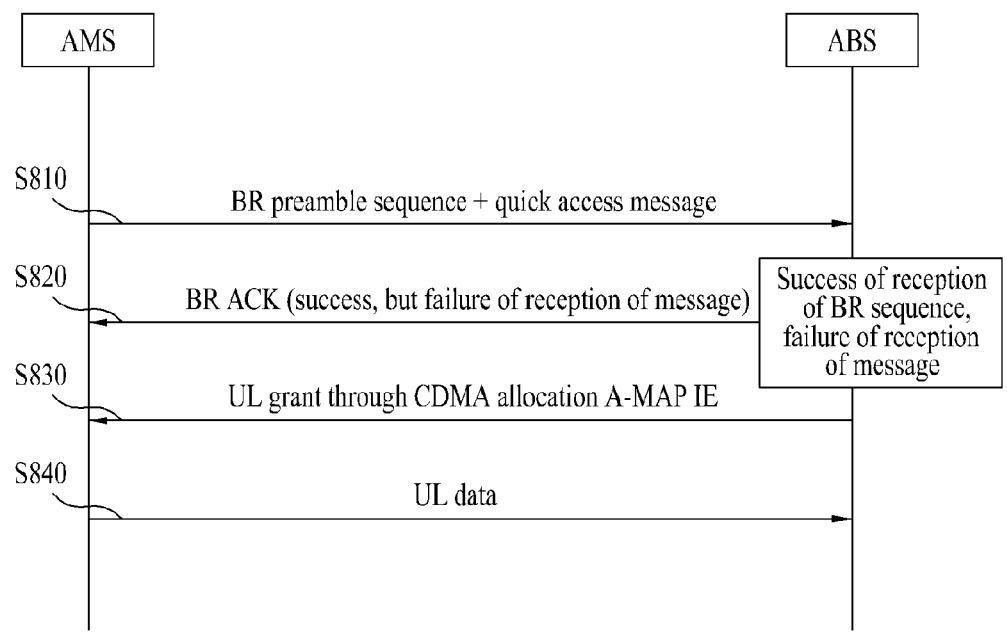
FIG. 8 is a diagram illustrating another example of the 3-step random access scheme according to another exemplary embodiment of the present invention.

FIG. 8 is a diagram illustrating another example of the 3-step random access scheme according to an exemplary embodiment of the present invention.

In FIG. 8, it is assumed that an AMS selects and uses a BR preamble sequence according to the BR preamble sequence of Table 4. That is, it is assumed that a BR preamble sequence set and a BR preamble sequence range are determined according to a service type of UL data, priority, and BR size. However, in FIG. 8, it is assumed that an ABS has normally received a BR preamble sequence but failed to receive a quick access message.

The AMS transmits a BR preamble sequence and a quick access message selected according to BR size and characteristics of UL data to be transmitted to the ABS (S810).

The AMS operates a BR timer after transmitting, in step S810, the message. When receiving radio resource allocation information for UL data transmission from the ABS or sensing reception failure through a BR ACK, before the BR timer is terminated, the AMS ends the corresponding timer. However, if the AMS does not receive the radio resource allocation information before the BR timer is terminated, the AMS may reattempt the UL resource request procedure of step S810.

Upon receiving the BR preamble sequence and the quick access message, the ABS may inform the AMS as to whether the BR preamble sequence and the quick access message have been received through the BR ACK message (S820).

The ABS may recognize the characteristics of data to be transmitted by the AMS and BR size through the received BR preamble sequence. Then, the ABS may allocate radio resources for UL data transmission in consideration of the characteristics of corresponding UL data and the BR size. However, since the ABS has not normally received the quick access message including an STID, the ABS is not able to discern which AMS has requested UL bandwidth.

Therefore, the ABS may inform the AMS of information about the allocated radio resources through CDMA allocation A-MAP IE which is CRC-masked to a Random Access ID (RAID) (S830).

In step S830, RAID is an ID generated by a BR preamble sequence received by the ABS and by a BR opportunity at which the corresponding sequence is sensed and can be recognized by the ABS and the AMS. That is, although the ABS has not normally received the quick access message, the ABS is able to discern BR size demanded by the AMS and characteristics of UL data to be transmitted.

The AMS may transmit UL data to the ABS through an allocated UL resource region (S840).

Figure 9:
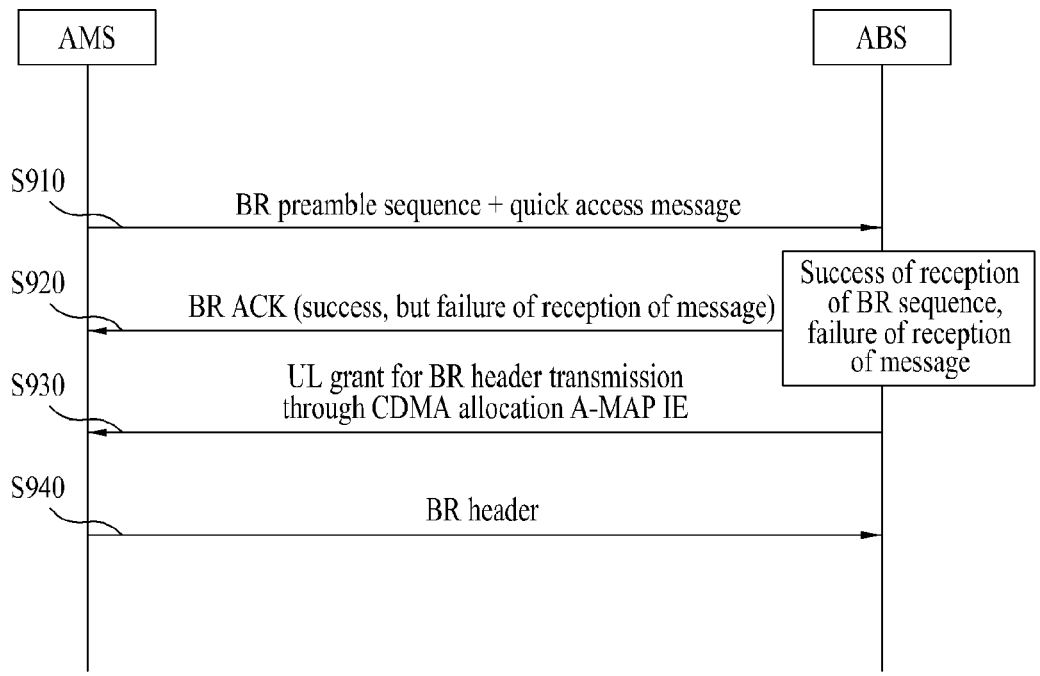
FIG. 9 is a diagram illustrating still another example of the 3-step random access scheme according to another exemplary embodiment of the present invention.

FIG. 9 is a diagram illustrating still another example of the 3-step random access scheme according to an exemplary embodiment of the present invention.

It is assumed in FIG. 9 that an AMS selects and uses a BR preamble sequence according to the BR preamble sequence mapping rule of Table 7 or the mapping rule such as the above-described DSx processing of Table 8. That is, it is assumed that a BR preamble sequence set and a BR preamble sequence range are determined according to a service type of UL data, priority, BR size, and/or a BR size index. However, it is assumed in FIG. 9 that the ABS has normally received a BR preamble sequence transmitted by the AMS and fails to receive a quick access message.

The AMS selects a BR preamble sequence based on the mapping scheme described in Table 7 according to BR size and characteristics of UL data to be transmitted. Accordingly, the AMS transmits the selected BR preamble sequence and a quick access message to the ABS (S910).

Upon receiving the BR preamble sequence and quick access message, the ABS may inform the AMS whether the BR preamble sequence and the quick access message have been received through a BR ACK message (S920).

The ABS is able to be aware of only the characteristics of data to be transmitted by the AMS through the received BR preamble sequence. However, since the ABS has not normally received the quick access message including an STID for identifying the AMS, the ABS cannot recognize which MS has requested how much UL bandwidth.

Accordingly, the ABS allocates UL radio resources for transmitting a BR header to the AMS and may inform the AMS of information about the allocated radio resources through a CDMA allocation A-MAP IE which is CRC-masked to an RAID (S930).

In step S930, the RAID is an ID generated by the BR preamble sequence received by the ABS and by a BR opportunity at which the corresponding sequence is sensed and can be recognized by the ABS and the AMS. Since the ABS can discern characteristics of UL data to be transmitted by the AMS although it has not normally received the quick access message, it is able to know whether resource allocation for BR header transmission is urgent. If the AMS selects the BR preamble sequence based only on the mapping scheme described in Table 8, the ABS cannot know even the characteristics of UL data to be transmitted by the AMS.

The AMS may transmit a BR header to the ABS through an allocated UL resource region (S940).

Figure 10:
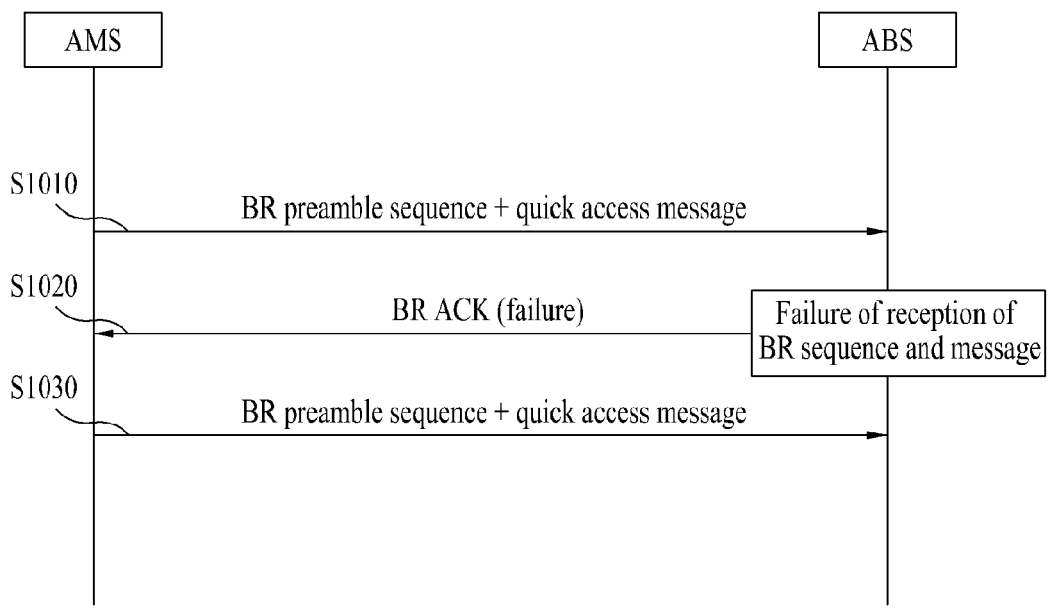
FIG. 10 is a diagram illustrating yet another example of the 3-step random access scheme according to another exemplary embodiment of the present invention.

FIG. 10 is a diagram illustrating yet another example of the 3-step random access scheme according to an exemplary embodiment of the present invention.

In FIG. 10, it is assumed that an AMS selects and uses a BR preamble sequence according to the BR preamble sequence mapping rule of Table 4. That is, it is assumed that a BR preamble sequence set and a BR preamble sequence range are determined according to a service type of UL data, priority, and BR size. It is also assumed in FIG. 10 that an ABS fails to receive both a BR preamble sequence and a quick access message which are transmitted by the AMS.

Referring to FIG. 10, the AMS may transmit a BR preamble sequence and a quick access message selected according to the BR preamble sequence mapping rule of Table 4 (S1010).

The AMS operates a BR timer after transmitting the BR preamble sequence and the quick access message. Upon receiving UL radio resource allocation information or sensing a reception failure of the BR preamble sequence and the quick access message through a BR ACK, before the BR timer is ended, the AMS may end the BR timer. However, if the AMS does not receive the radio resource allocation information before the BR timer is terminated, the AMS may repeat step S1010.

Upon receiving the BR preamble sequence and the quick access message, the ABS may inform the AMS as to whether the BR preamble sequence and the quick access message have been received through the BR ACK message (S1020).

Since the ABS has failed to receive both the BR preamble sequence and the quick access message, there is no information about the BR preamble sequence transmitted by the AMS within a reception sequence list included in the BR ACK message. Accordingly, the AMS terminates the BR timer and retransmits the BR preamble sequence and the quick access message transmitted in step S1010 to the ABS (S1030).

In FIGS. 7 to 10, although methods have been described for selecting and using the BR preamble sequence mapped according to the BR preamble sequence mapping scheme described in Table 4, 7, or 8, the AMS may select the BR preamble mapped according to the BR preamble sequence mapping schemes described in Table 1 to Table 3, Table 5, and Table 6.

Figure 11:
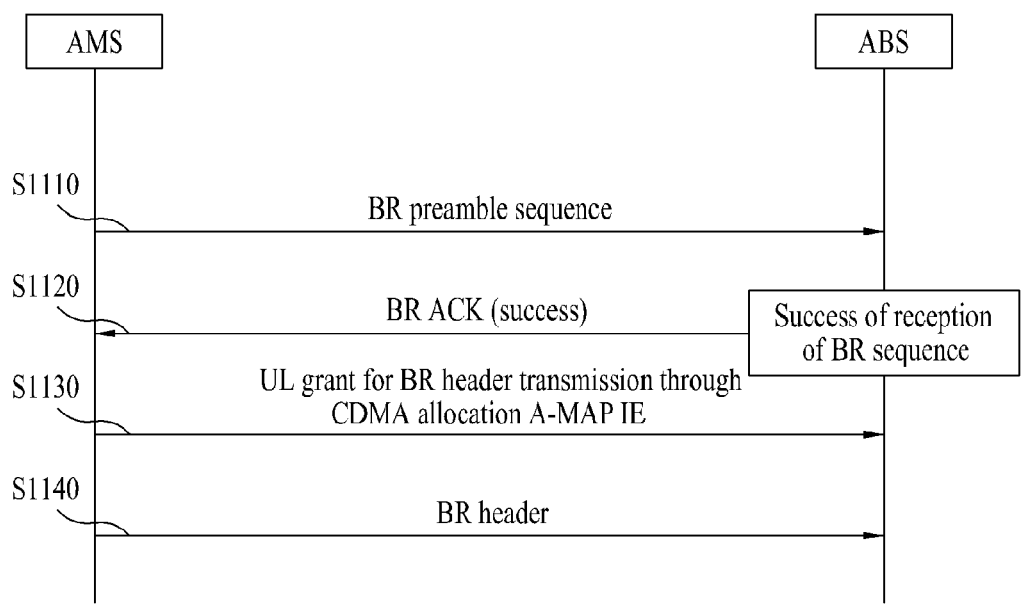
FIG. 11 is a diagram illustrating an example of a 5-step random access scheme according to still another exemplary embodiment of the present invention.

FIG. 11 is a diagram illustrating an example of a 5-step random access scheme according to an exemplary embodiment of the present invention.

In the exemplary embodiments of the present invention, it is assumed that a BR preamble sequence used in a 3-step random access scheme and a BR preamble sequence used in a 5-step random access scheme are discriminated. For example, when using the 3-step random access scheme, an AMS uses the BR preamble sequence mapping rule described in Table 1 to Table 8, and when using the 5-step random access scheme, it uses BR preamble sequences except for the BR preamble sequence mapped to the 3-step random access scheme. That is, a BR preamble sequence set is configured according to the 3-step or 5-step random access scheme and a BR preamble sequence may be selected from the corresponding set.

An AMS transmits a BR preamble sequence allocated for the 5-step random access scheme in order to request UL bandwidth allocation to an ABS (S1110).

In step S1110, the AMS starts a default BR timer after transmitting the BR preamble sequence. When no UL radio allocation information is received or transmission failure of the BR preamble sequence is sensed through a BR ACK, before the default BR timer is terminated, the AMS terminates the default BR timer. However, if the radio resource allocation information is not received before the default BR timer is terminated, the AMS may repeat step S1110.

If the received BR preamble sequence is recognized as a sequence allocated for the 5-step random access scheme, the ABS does not perform decoding for a quick access message. Upon receiving the BR preamble sequence, the ABS may inform the AMS through the BR ACK message as to whether the BR preamble sequence has been normally received (S1120).

The ABS is not able to recognize, through the received BR preamble sequence, characteristics of data to be transmitted by the AMS and BR size. Accordingly, the ABS may allocate UL radio resources for transmitting a BR header to the AMS and may inform the AMS of information about the allocated radio resources through a CDMA allocation A-MAP IE which is CRC-masked to an RAID (S1130).

In step S1130, the RAID is an ID generated by the BR preamble sequence received by the ABS and by a BR opportunity at which the corresponding sequence is sensed and may be identified by the ABS and the AMS.

The AMS may transmit the BR header to the ABS through an allocated UL resource region (S1140).

Figure 12:
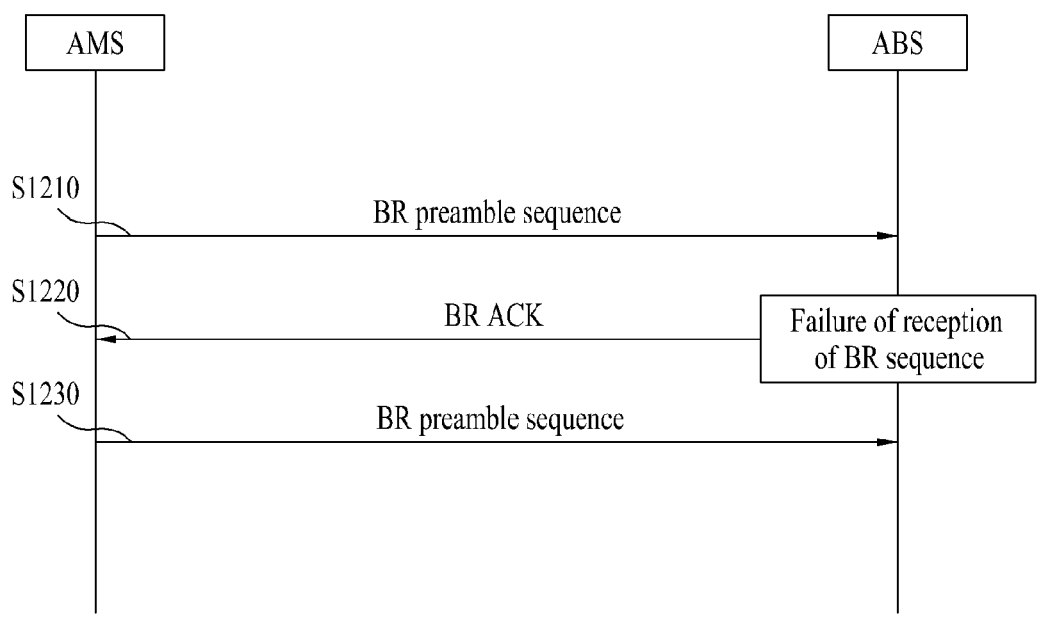
FIG. 12 is a diagram illustrating another example of the 5-step random access scheme according to still another exemplary embodiment of the present invention.

FIG. 12 is a diagram illustrating another example of the 5-step random access scheme according to an exemplary embodiment of the present invention.

In FIG. 12, a 5-step UL resource request process is shown when an ABS has not normally received a dedicated BR preamble sequence used for the 5-step random access scheme transmitted by an AMS.

The AMS transmits a BR preamble sequence occupied for the 5-step random access scheme to the ABS in order to request radio resource allocation (S1210).

The AMS starts a default BR timer after transmitting the BR preamble sequence. When no UL radio allocation information is received or transmission failure of the BR preamble sequence is sensed through a BR ACK, before the default BR timer is ended, the AMS terminates the default BR timer. However, if the radio resource allocation information is not received before the default BR timer is terminated, the AMS may reattempt a UL resource request procedure.

Upon receiving the BR preamble sequence, the ABS may inform the AMS through the BR ACK message as to whether the BR preamble sequence has been normally received (S1220).

Since the ABS has failed to receive the BR preamble sequence, a reception sequence list included in the BR ACK message does not include information about the BR preamble sequence transmitted by the AMS. Accordingly, the AMS terminates the BR timer and retransmits the BR preamble sequence transmitted in step S1210 to the ABS (S1230).

Figure 13:
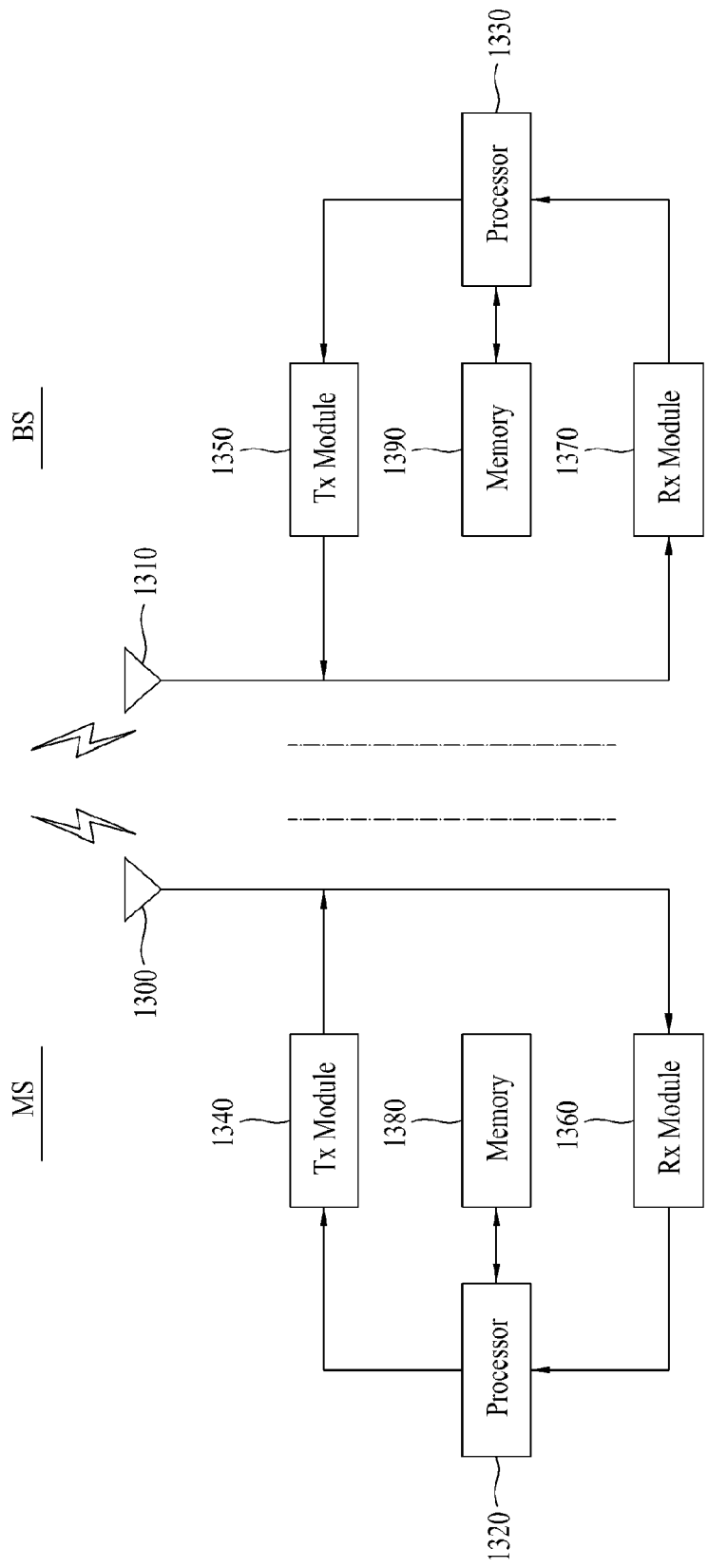
FIG. 13 is a diagram illustrating an MS and a BS through which the embodiments of the present invention described in FIGS. 2 to 12 can be carried out according to yet another exemplary embodiment of the present invention.

FIG. 13 is a diagram illustrating an MS and a BS through which the exemplary embodiments of the present invention described in FIGS. 2 to 12 can be carried out according to still another exemplary embodiment of the present invention.

The MS and the BS may include a transmitter and a receiver. Accordingly, the MS operates as a transmitting end in UL and as a receiving end in DL. The BS operates as a receiving end in UL and as a transmitting end in DL.

The MS and the BS may include Transmit (Tx) modules 1340 and 1350 and Receive (Rx) modules 1350 and 1370, respectively, for controlling transmission and reception of information, data, and/or messages, and may include antennas 1300 and 1310, respectively, for transmitting and receiving the information, data, and/or messages.

Each Tx module may control one or more Radio Frequency (RF) transmitters and each Rx module may control one or more RF receivers. The number of RF transmitters may differ from the number of RF receivers. In terms of the BS, it is desirable that the Rx module control one RF receiver to receive UL data and the TX module control two or more RF transmitters to transmit DL data.

The MS and the BS may include processors 1320 and 1330 for performing the above-described embodiments of the present invention and memories 1380 and 1390 for temporarily or permanently storing processes performed by the processors, respectively. Especially, the processors 1320 and 1330 may control the BR preamble sequence selection methods for performing the random access schemes described in the above exemplary embodiments of the present invention.

The processors included in the MS and the BS may include Medium Access Control (MAC) entities. The MAC entities are logical entities and may be present in the interior or exterior of the processors of the MS and the BS. That is, the MS and the BS may perform the exemplary embodiments of the present invention described in FIG. 2 to FIG. 12 using the MAC entities.

The Tx modules and Rx modules included in the MS and the BS may perform a packet modulation/demodulation function for data transmission, a quick packet channel coding function, Orthogonal Frequency Division Multiple Access (OFDMA) packet scheduling, Time Division Duplex (TDD) packet scheduling, and/or channel multiplexing.

The device described in FIG. 13 is a means for implementing the methods described in FIGS. 2 to 12. The exemplary embodiment of the present invention embodiments of the present invention may be performed using constituent elements and functions of the aforementioned MS and BS.

The processor 1320 included in the MS may perform the above-described BR preamble sequence selection methods I to III. That is, the processor may control the MS to select the BR preamble sequence according to information included in the QoS key parameter and data service characteristics. The MS may perform the 3-step or 5-step random access schemes described in FIGS. 7 to 12 using the selected BR preamble sequence.

Namely, the MS and the BS may perform signaling (e.g. DAx processing) for selecting the BR preamble sequence or may select the BR preamble sequence from a predefined BR index (e.g. the BR preamble mapping methods defined in Table 1 to Table 7) stored in the memory, by controlling the processor.

The processor of the MS transmits the selected BR preamble sequence and/or the quick access message to the BS by controlling the Tx module. The BS allocates UL radio resources to the MS by decoding the BR preamble sequence received through the Rx module. The processor of the BS may inform the MS of information about the allocated radio resources by controlling the Tx module.

Meanwhile, in the present invention, the MS may be any of a Personal Digital Assistant (PDA), a cellular phone, a Personal Communication Service (PCS) phone, a Global system for Mobile (GSM) phone, a Wideband (W) CDMA phone, a Mobile Broadband System (MBS) phone, a hand-held PC, a notebook PC, a smart phone, a Multi Mode-Multi Band (MM-MB) terminal, etc.

The smart phone is a terminal having the advantages of both a mobile communication terminal and a PDA. It incorporates the functions of a PDA, that is, scheduling and data communication such as fax transmission and reception and Internet connection into a mobile communication terminal. The MM-MB terminal refers to a terminal which has a multi-modem chip therein and which can operate in any of mobile Internet systems and other mobile communication systems (e.g., a Code Division Multiple Access (CDMA) 2000 system, a Wideband CDMA (WCDMA), etc.).

The exemplary embodiments of the present invention may be achieved by various means, for example, hardware, firmware, software, or a combination thereof.

In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiment of the present invention may be achieved by a module, a procedure, a function, etc. performing the above-described functions or operations. For example, software code may be stored in the memory units 1380 and 1390 and executed by the processors 1320 and 1330. The memory units are located at the interior or exterior of the processor and may transmit data to and receive data from the processor via various known means.

The present invention may be carried out in other specific ways without departing from the spirit and essential characteristics of the present invention. The above detailed description is therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, claims that are not explicitly cited in the appended claims may be presented in combination as an exemplary embodiment of the present invention or included as a new claim by subsequent amendment after the application is filed.

The embodiments of the present invention may be applied to various wireless access systems, for example, a 3rd Generation Partnership Project (3GPP), 3GPP2, and/or Institute of Electrical and Electronic Engineers 802 (IEEE 802,xx) system. The embodiments of the present invention may be applied to all technical fields applying the various wireless access systems, as well as the various wireless access systems.

What is claimed is:

1. A method for performing random access in a wireless access system, the method performed by a mobile station and comprising:

receiving a dynamic service addition request (DSA-REQ) message requesting a creation of a service flow from a base station, the DSA-REQ message including a quality of service (QoS) parameter for the service flow and a bandwidth request (BR) index which is mapped to a BR size and a service type of the service flow;

transmitting a dynamic service addition response (DSA-RSP) message comprising the BR index to the base station;

transmitting a BR preamble sequence and a quick access message to the base station in order to perform the random access, wherein the BR preamble is selected based on the BR index; and receiving, from the base station, a BR acknowledge A-MAP information element (RB ACK A-MAP IE) representing a reception status of at least the BR preamble sequence and the quick access message, wherein the BR index is determined by considering the QoS parameter, and the BR size indicates a size of a requested bandwidth, and wherein the quick access message comprises a station identifier (STID) identifying the mobile station.

2. The method according to claim 1,
wherein the quick access message further comprises the BR index.

3. A mobile station for performing random access in a wireless access system, the mobile station comprising:
a transmit module;
a receive module; and
a processor for controlling the random access,
wherein the processor is configured to:
receive, from a base station, a dynamic service addition request (DSA-REQ) message requesting a creation of a service flow by using the receive module, the DSA-REQ message including a quality of service (QoS) parameter for the service flow and a bandwidth request (BR) index which is mapped to a BR size and a service type of the service flow;
transmit a dynamic service addition response (DSA-RSP) message including the BR index to the base station by using the transmit module;
transmit a BR preamble sequence and a quick access message to the base station in order to perform the random access, wherein the BR preamble is selected based on the BR index; and
receive, from the base station, a BR acknowledge A-MAP information element (RB ACK A-MAP IE) representing a reception status of at least the BR preamble sequence and the quick access message by using the receive module,
wherein the BR index is determined by considering the QoS parameter, and the BR size indicates a size of a requested bandwidth, and
wherein the quick access message comprises a station identifier (STID) identifying the mobile station.

4. The mobile station according to claim 3,
wherein the quick access message further comprises the BR index.

5. A method for supporting a random access in a base station of a wireless access system, the method performed by the base station and comprising:

transmitting a dynamic service addition request (DSA-REQ) message to create a service flow to a mobile station, the DSA-REQ message including a quality of service (QoS) parameter for the service flow and a bandwidth request (BR) index which is mapped to a BR size and a service type of the service flow;

receiving a dynamic service addition response (DSA-RSP) message comprising the BR index from the mobile station in response to the DSA-REQ message;

receiving a BR preamble sequence and a quick access message from the mobile station which is received for performing the random access, wherein the BR preamble is selected based on the BR index; and transmitting, to the mobile station, a BR acknowledge A-MAP information element (RB ACK A-MAP IE) representing a reception status of at least the BR preamble sequence and the quick access message, wherein the BR index is determined by considering the QoS parameter, and the BR size indicates a size of a requested bandwidth, and wherein the quick access message comprises a station identifier (STID) identifying a mobile station.

6. The method according to claim 5, wherein the base station receives a quick access message together with the BR preamble sequence, and
wherein the quick access message further comprises the BR index.

7. A base station for supporting a random access in a wireless access system, comprising:
a transmit module;
a receive module; and
a processor for controlling the random access,
wherein the processor is configured to:
transmit, to a mobile station, a dynamic service addition request (DSA-REQ) message to create a service flow by using the transmit module, the DSA-REQ message including a quality of service (QoS) parameter for the service flow and a bandwidth request (BR) index which is mapped to a BR size and a service flow type of the service flow;
receive a dynamic service addition response (DSA-RSP) message including the BR index from the mobile station in order to perform the random access by using the receive module;
receive a BR preamble sequence and a quick access message from the mobile station which is received for performing the random access, wherein the BR preamble is selected based on the BR index; and
transmit, to the mobile station, a BR acknowledge A-MAP information element (RB ACK A-MAP IE) representing a reception status of at least the BR preamble sequence and the quick access message,
wherein the BR index is determined by considering the QoS parameter, and the BR size indicates a size of a requested bandwidth, and
wherein the quick access message comprises a station identifier (STID) identifying a mobile station.

8. The base station according to claim 7,
wherein the quick access message further comprises the BR index.

* * * * *